United States Patent
Inoue

(10) Patent No.: US 12,431,987 B2
(45) Date of Patent: Sep. 30, 2025

(54) MOBILE TERMINAL TESTING DEVICE AND METHOD FOR DISPLAYING EVM MEASUREMENT RESULT OF SRS USING SAME

(71) Applicant: ANRITSU CORPORATION, Kanagawa (JP)

(72) Inventor: Naoki Inoue, Kanagawa (JP)

(73) Assignee: ANRITSU CORPORATION, Kanagawa (JP)

( * ) Notice: Subject to any disclaimer, the term of this patent is extended or adjusted under 35 U.S.C. 154(b) by 342 days.

(21) Appl. No.: 18/308,808

(22) Filed: Apr. 28, 2023

(65) Prior Publication Data

US 2024/0039643 A1 Feb. 1, 2024

(30) Foreign Application Priority Data

Jul. 28, 2022 (JP) ................. 2022-120744

(51) Int. Cl.
*H04B 17/00* (2015.01)
(52) U.S. Cl.
CPC ............... *H04B 17/0085* (2013.01)
(58) Field of Classification Search
CPC H04B 17/0085; H04B 17/23; H04B 17/3912; H04W 24/06
USPC ............................. 455/67.1, 67.14
See application file for complete search history.

(56) References Cited

U.S. PATENT DOCUMENTS

| | | | |
|---|---|---|---|
| 2001/0004246 A1* | 6/2001 | Asami | G01R 31/31919 341/120 |
| 2017/0366282 A1* | 12/2017 | Aoki | H04W 24/06 |
| 2019/0037424 A1* | 1/2019 | Shirasaki | H04L 5/001 |
| 2020/0127746 A1* | 4/2020 | Fujiwara | H04W 80/02 |
| 2020/0169335 A1* | 5/2020 | Hosoya | H04B 17/20 |
| 2022/0038197 A1* | 2/2022 | Endo | H04B 17/0085 |
| 2022/0191860 A1 | 6/2022 | Nishio et al. | |

FOREIGN PATENT DOCUMENTS

WO 2012-066736 A1 5/2012

* cited by examiner

*Primary Examiner* — Don N Vo
(74) *Attorney, Agent, or Firm* — McDonald Hopkins LLC

(57) ABSTRACT

To provide a mobile terminal testing device capable of easily referring to an EVM measurement result of an SRS by automatically calculating an allocation position of the SRS. The mobile terminal testing device includes: a pseudo base station unit 2 that transmits and receives an RF signal to and from a mobile terminal 10; a scenario processing unit 3 that transmits notification information to the pseudo base station unit 2 and executes a communication sequence with the mobile terminal 10, based on a scenario of a test; and a control unit 6 that calculates an allocation position of an SRS based on a set parameter, and displays an EVM measurement result such that the allocation position of the SRS is recognized.

9 Claims, 4 Drawing Sheets

MOBILE TERMINAL TESTING DEVICE AND METHOD FOR DISPLAYING EVM MEASUREMENT RESULT OF SRS USING SAME

TECHNICAL FIELD

The present invention relates to a mobile terminal testing device that performs a test of a mobile terminal.

BACKGROUND ART

When a mobile terminal for performing communication while moving, such as a mobile phone or a data communication terminal, is developed, the developed mobile terminal needs to be tested whether or not communication can be normally performed. Therefore, a mobile terminal to be tested is connected to a testing device operated as a pseudo base station that simulates functions of an actual base station to perform communication between the testing device and the mobile terminal, and a test to confirm contents of the communication is performed.

As mobile communication systems, long term evolution (LTE), 5th generation (5G), new radio (NR), and the like are being served.

In order to estimate a wireless propagation path between the mobile terminal and the base station, the LTE or 5GNR transmits a sounding reference signal (SRS) from the mobile terminal to the base station, and the base station measures the received SRS to estimate a quality of the wireless propagation path between the mobile terminal and the base station.

Patent Document 1 discloses a technology for reducing a possibility of misrecognition of SRS transmission or SRS resources between an SRS transmitting side and an SRS receiving side in LTE.

RELATED ART DOCUMENT

Patent Document

[Patent Document 1] WO 2012/066736

DISCLOSURE OF THE INVENTION

Problem that the Invention is to Solve

In a mobile terminal test, error vector magnitude (EVM) is measured as a measurement of a signal transmitted by the mobile terminal, and results thereof are displayed. However, the EVM for the SRS is not measured.

According to the standard, the SRS is arranged in the sixth symbol or the fifth and sixth symbols at an end of a subframe, but the entirety of the symbol is assigned to a part of a symbol rather than the SRS. When referring to the EVM measurement result of the SRS, it is necessary to know an allocation position of the SRS in the symbol.

However, the allocation position of the SRS has to be obtained from a frequency bandwidth of the SRS, a frequency bandwidth of the mobile terminal, and the like, resulting in time consumption.

Accordingly, an object of the present invention is to provide a mobile terminal testing device capable of easily referring to an EVM measurement result of an SRS by automatically calculating an allocation position of the SRS.

Means for Solving the Problem

A mobile terminal testing device according to the present invention is a mobile terminal testing device for testing a mobile terminal by simulating a base station for mobile communication, in which the mobile terminal testing device includes: a control unit that calculates an allocation position of an SRS based on a set parameter and displays an EVM measurement result such that the allocation position of the SRS is recognized.

With this configuration, the allocation position of the SRS is calculated based on the set parameter, and the EVM measurement result is displayed such that the allocation position of the SRS is recognized. Therefore, it is possible to easily refer to the EVM measurement result of the SRS.

In addition, in the mobile terminal testing device according to the present invention, the control unit displays a symbol in which the SRS is arranged in an identifiable manner.

With this configuration, the symbol in which the SRS is arranged is displayed in an identifiable manner. Therefore, it is possible to easily identify and refer to the EVM measurement result of the SRS and the normal EVM measurement result.

In addition, in the mobile terminal testing device according to the present invention, the control unit displays the allocation position of the SRS in a symbol in which the SRS is arranged.

In addition, the mobile terminal testing device of the present invention further includes: a pseudo base station unit; a scenario processing unit that transmits and receives an RF signal between the pseudo base station unit and the mobile terminal; an operation unit that outputs, to the control unit, information necessary for generation of a scenario that is input by an operation; and a display unit that displays the EVM measurement result.

In addition, in the mobile terminal testing device according to the present invention, the display unit further includes a symbol display unit, a detailed result display unit, and a symbol designation unit, the symbol display unit displays, on a time axis, an EVM state of a slot designated such that the EVM state is input into the operation unit and displayed, and the symbol designation unit designates a symbol to be displayed on the detailed result display unit among slots displayed on the symbol display unit.

In addition, in the mobile terminal testing device according to the present invention, the control unit makes a display of a part other than the allocation position of the SRS displayed on the detailed result display unit different from a normal display.

In addition, in the mobile terminal testing device according to the present invention, the control unit also makes a display for a symbol in which the SRS of the symbol display unit is arranged different from a normal display.

In addition, in the mobile terminal testing device according to the present invention, when the allocation position of the SRS is an abnormal value, the control unit presents to a user a case that is considered as a cause of an error.

In addition, a method for displaying an EVM measurement result of an SRS according to the present invention is a method for displaying an EVM measurement result of an SRS of a mobile terminal testing device for testing a mobile terminal by simulating a base station of mobile communication, in which the method includes: calculating an allocation position of the SRS based on a set parameter; and displaying an EVM measurement result such that the allocation position of the SRS is recognized, based on the calculated allocation position of the SRS.

With this configuration, the allocation position of the SRS is calculated based on the set parameter, and the EVM measurement result is displayed such that the allocation position of the SRS is recognized. Therefore, it is possible to easily refer to the EVM measurement result of the SRS.

Advantage of the Invention

According to the present invention, it is possible to provide a mobile terminal testing device capable of easily referring to an EVM measurement result of an SRS by automatically calculating an allocation position of the SRS.

BEST MODE FOR CARRYING OUT THE INVENTION

Hereinafter, a mobile terminal testing device according to an embodiment of the present invention will be described with reference to the drawings.

Figure 1:
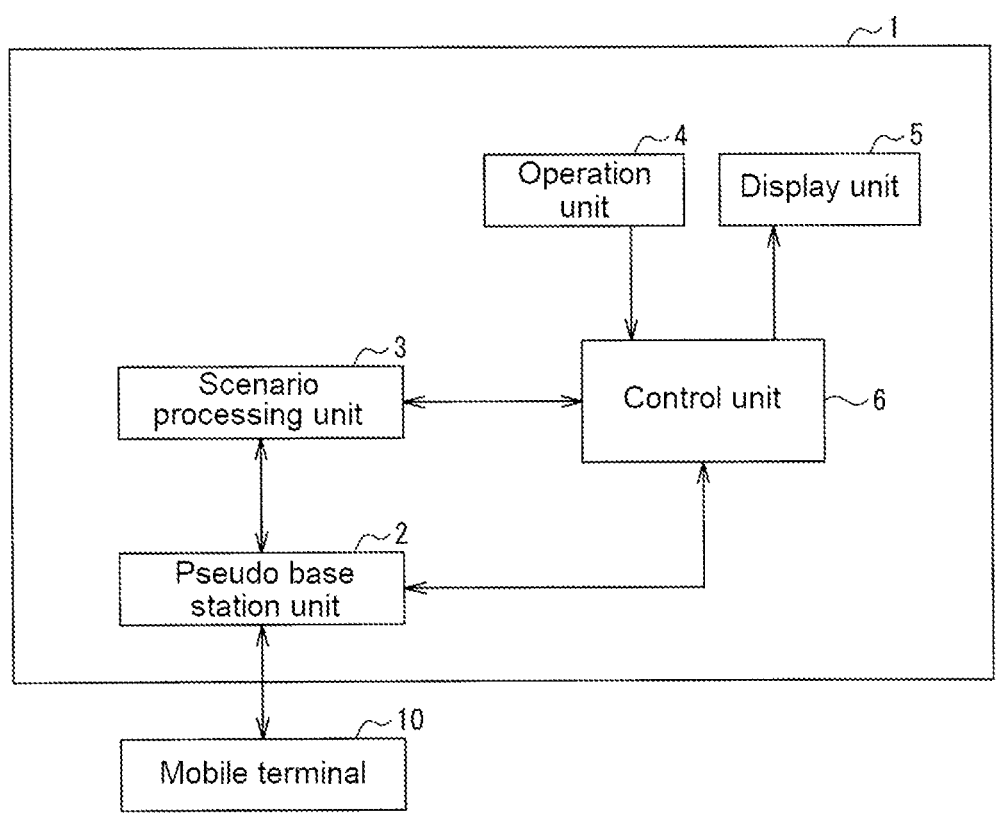
FIG. 1 is a block diagram of main parts of a mobile terminal testing device according to one embodiment of the present invention.

In FIG. 1, a mobile terminal testing device 1 according to one embodiment of the present invention transmits and receives a radio frequency (RF) signal to and from a mobile terminal 10 by wire via a coaxial cable or the like as a pseudo base station. The mobile terminal testing device 1 may wirelessly transmit and receive the RF signal to and from the mobile terminal 10 via an antenna.

The mobile terminal testing device 1 includes a pseudo base station unit 2, a scenario processing unit 3, an operation unit 4, a display unit 5, and a control unit 6.

The pseudo base station unit 2 transmits and receives the RF signal to and from the mobile terminal 10 under the control of the scenario processing unit 3. The pseudo base station unit 2 outputs a communication state with the mobile terminal 10 and the like to the control unit 6.

The pseudo base station unit 2 can perform LTE communication with the mobile terminal 10 according to the LTE standard. The pseudo base station unit 2 may perform 5GNR communication with the mobile terminal 10 according to the 5GNR standard.

The operation unit 4 is composed of input devices such as a keyboard, a mouse, and a touch panel, and outputs, to the control unit 6, information and the like required to generate a scenario in which an operation is input. The display unit 5 is composed of an image display device such as a liquid crystal display, and displays an image for inputting information required to generate a scenario, an image showing a state during a test, or the like.

In accordance with the instruction input to the operation unit 4, the control unit 6 causes the display unit 5 to display a test scenario creation screen to input information required to generate a test scenario, or generates a test scenario based on the information input to the operation unit 4 in the test scenario creation screen. In addition, in accordance with the instruction input to the operation unit 4, the control unit 6 transmits the instruction to the scenario processing unit 3 to execute a test based on the test scenario stored in a storage device, or causes the display unit 5 to display the state during the test and the like based on the information such as a state of each layer transmitted from the scenario processing unit 3 or a communication state with the mobile terminal 10.

In this case, the mobile terminal testing device 1 is composed of a computer device (not shown) including a communication module for performing communication with the mobile terminal 10. The computer device includes a central processing unit (CPU), read only memory (ROM), random access memory (RAM), a storage device such as a hard disk device, an input/output port, and a touch panel (each of which is not shown in the drawings).

A program for causing the computer device to function as the mobile terminal testing device 1 is stored in the ROM and the hard disk device of the computer device. That is, the computer device functions as the mobile terminal testing device 1 by the CPU executing the program stored in the ROM using the RAM as a work area.

Thus, in the present embodiment, the scenario processing unit 3 and the control unit 6 are configured by the CPU, and the pseudo base station unit 2 is configured by the communication module.

In the mobile terminal testing device 1 configured as described above, EVM of the signal transmitted by the mobile terminal 10 can be measured, and a result thereof can be displayed on the display unit 5.

Figure 2:
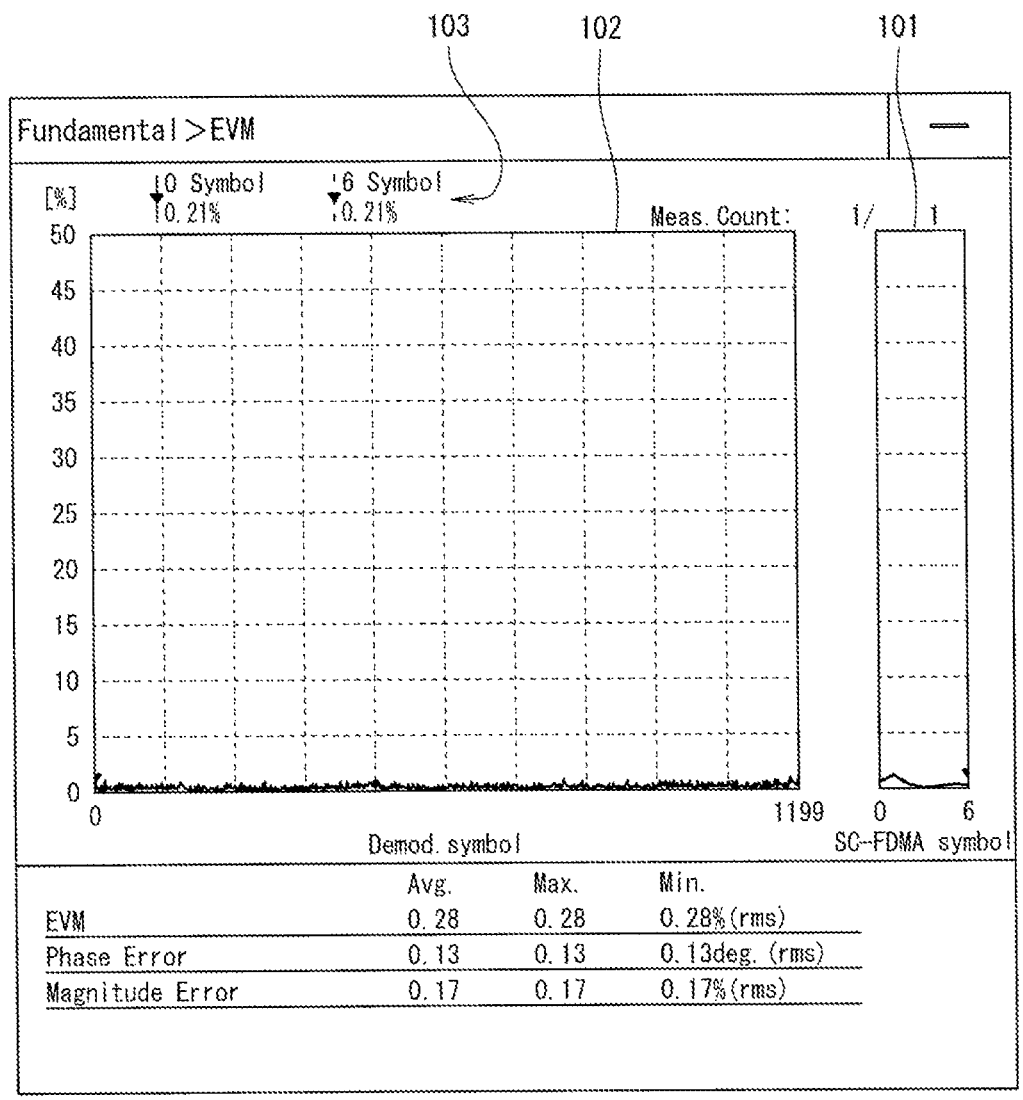
FIG. 2 is a diagram showing an example of a display screen of an EVM measurement result of the mobile terminal testing device according to one embodiment of the present invention.

As shown in FIG. 2, a display screen of an EVM measurement result includes a symbol display unit 101, a detailed result display unit 102, and a symbol designation unit 103.

The symbol display unit 101 displays, on a time axis, an EVM state of a slot designated such that the EVM state is input into the operation unit 4 and displayed.

The detailed result display unit 102 displays the EVM state of the designated symbol of the slot, which is displayed on the symbol display unit 101.

The symbol designation unit 103 designates a symbol to be displayed on the detailed result display unit 102 among slots displayed on the symbol display unit 101.

The mobile terminal testing device 1 of the present embodiment can display the EVM measurement result of the SRS.

The SRS is allocated to part of the symbol. When referring to the EVM measurement result of the SRS, it is necessary to know an allocation position of the SRS in the symbol.

However, the allocation position of the SRS has to be obtained from a frequency bandwidth of the SRS, a frequency bandwidth of the mobile terminal, and the like, resulting in time consumption.

When a display of the EVM of the SRS is selected by an operation of the operation unit 4, the control unit 6 automatically calculates an allocation position of the SRS from a frequency bandwidth of the SRS set as a parameter of a pseudo base station or a frequency bandwidth of the mobile terminal, and displays the EVM measurement result on the display screen such that the allocation position of the SRS can be recognized.

Figure 3:
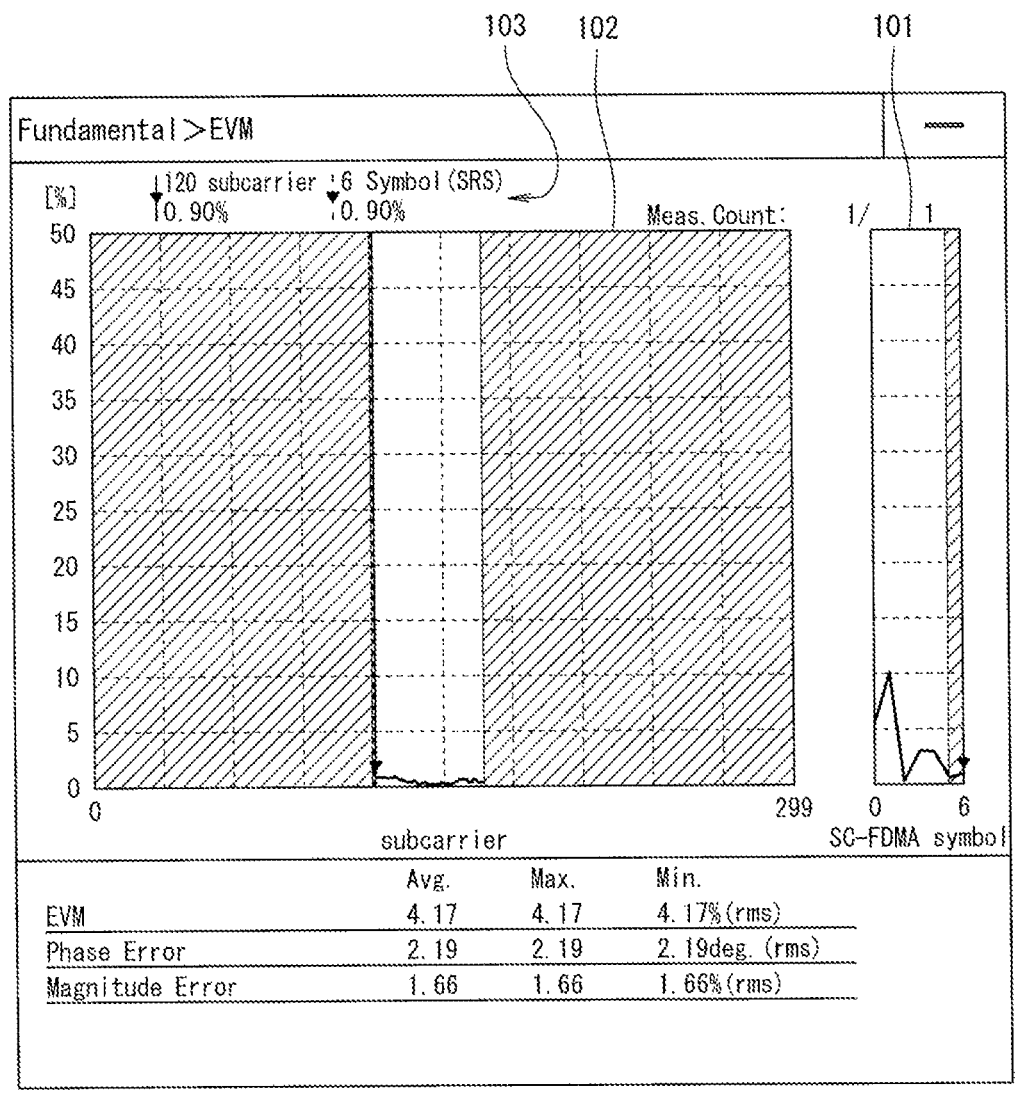
FIG. 3 is a diagram showing an example of a display screen of an EVM measurement result of an SRS at a sixth symbol of the mobile terminal testing device according to one embodiment of the present invention.

For example, as shown in FIG. 3, the control unit 6 makes a display of a part other than the allocation position of the SRS of the detailed result display unit 102 different from a normal display, for example, changing color or shading.

Moreover, a symbol to which the SRS of the symbol display unit 101 is allocated may also make a display different from the normal display, for example, changing color or shading. FIG. 3 shows a case where the SRS is arranged in the sixth symbol.

Figure 4:
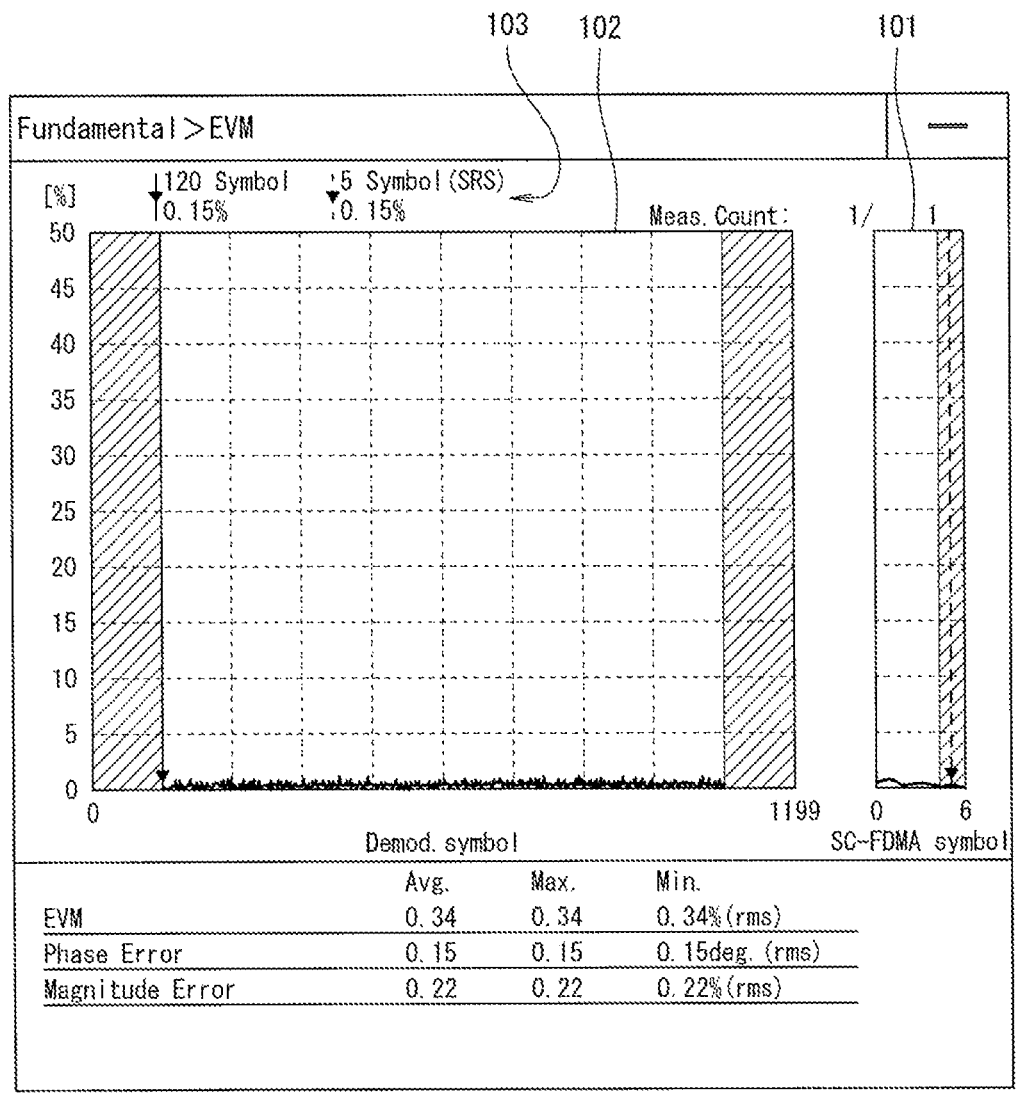
FIG. 4 is a diagram showing an example of a display screen of an EVM measurement result of an SRS at a fifth symbol of the mobile terminal testing device according to one embodiment of the present invention.

When the SRS is arranged in the fifth and sixth symbols, the control unit 6 displays the display screen of the EVM measurement result as shown in FIG. 4, for example. In FIG. 4, the symbol designation unit 103 designates the fifth symbol, and the EVM of the SRS at the fifth symbol is displayed.

When the allocation position of the calculated SRS is an abnormal value, for example, the number of resource blocks (RBs) of the SRS exceeds an upper limit of the number of RBs in a channel bandwidth, the control unit 6 determines the allocation position of the calculated SRS as an error.

Moreover, when the allocation position of the SRS is an error, the control unit 6 may present to a user a case that is considered as a cause of the error.

Thus, the cause of the error can be confirmed, and a parameter can thus be corrected early.

As described above, in the above embodiment, when the EVM measurement result of the SRS is displayed, the control unit 6 automatically calculates the allocation position of the SRS based on the set parameter, and displays the EVM measurement result such that the allocation position of the SRS is recognized.

As a result, the EVM measurement result is displayed such that the allocation position of the SRS can be recognized without calculating the allocation position of the SRS, and the EVM measurement result of the SRS can be easily referred to.

Moreover, the control unit 6 displays a position of the SRS in the slot on the symbol display unit 101 such that the position of the SRS in the slot is recognized.

Accordingly, the symbol in which the SRS is arranged can be easily identified, and the EVM measurement result of the SRS and the normal EVM measurement result can be easily identified and referred to.

Although the embodiment of the present invention has been disclosed, it is apparent that those skilled in the art could have made changes without departing from the scope of this invention. It is intended that any and all such modifications and equivalents are involved in the appended claims.

DESCRIPTION OF REFERENCE NUMERALS AND SIGNS

1 Mobile terminal testing device
2 Pseudo base station unit
3 Scenario processing unit
4 Operation unit
5 Display unit
6 Control unit
10 Mobile terminal

What is claimed is:

1. A mobile terminal testing device for testing a mobile terminal by simulating a base station of mobile communication, the mobile terminal testing device comprising:
   a control unit that calculates an allocation position of a sounding reference signal (SRS) based on a set parameter and displays an error vector magnitude (EVM) measurement result such that the allocation position of the SRS is recognized.

2. The mobile terminal testing device according to claim 1, wherein the control unit displays a symbol in which the SRS is arranged in an identifiable manner.

3. The mobile terminal testing device according to claim 1, wherein the control unit displays the allocation position of the SRS in a symbol in which the SRS is arranged.

4. The mobile terminal testing device according to claim 1, further comprising:
   a pseudo base station unit;
   a scenario processing unit that transmits and receives a radio frequency (RF) signal between the pseudo base station unit and the mobile terminal;
   an operation unit that outputs, to the control unit, information necessary for generation of a scenario that is input by an operation; and
   a display unit that displays the EVM measurement result.

5. The mobile terminal testing device according to claim 4, wherein the display unit includes a symbol display unit, a detailed result display unit, and a symbol designation unit,
   the symbol display unit displays, on a time axis, an EVM state of a slot designated such that the EVM state is input into the operation unit and displayed, and
   the symbol designation unit designates a symbol to be displayed on the detailed result display unit among slots displayed on the symbol display unit.

6. The mobile terminal testing device according to claim 5, wherein the control unit makes a display of a part other than the allocation position of the SRS displayed on the detailed result display unit different from a normal display.

7. A mobile terminal testing device according to claim 5, wherein the control unit also makes a display for a symbol in which the SRS of the symbol display unit is arranged different from a normal display.

8. The mobile terminal testing device according to claim 1, wherein when the allocation position of the SRS is an abnormal value, the control unit presents to a user a case that is considered as a cause of an error.

9. A method for displaying an error vector magnitude (EVM) measurement result of a sounding reference signal (SRS) of a mobile terminal testing device for testing a mobile terminal by simulating a base station of mobile communication, the method comprising:
   calculating an allocation position of the SRS based on a set parameter; and
   displaying an EVM measurement result such that the allocation position of the SRS is recognized, based on the calculated allocation position of the SRS.

\* \* \* \* \*